United States Patent Office 2,931,420
Patented Apr. 5, 1960

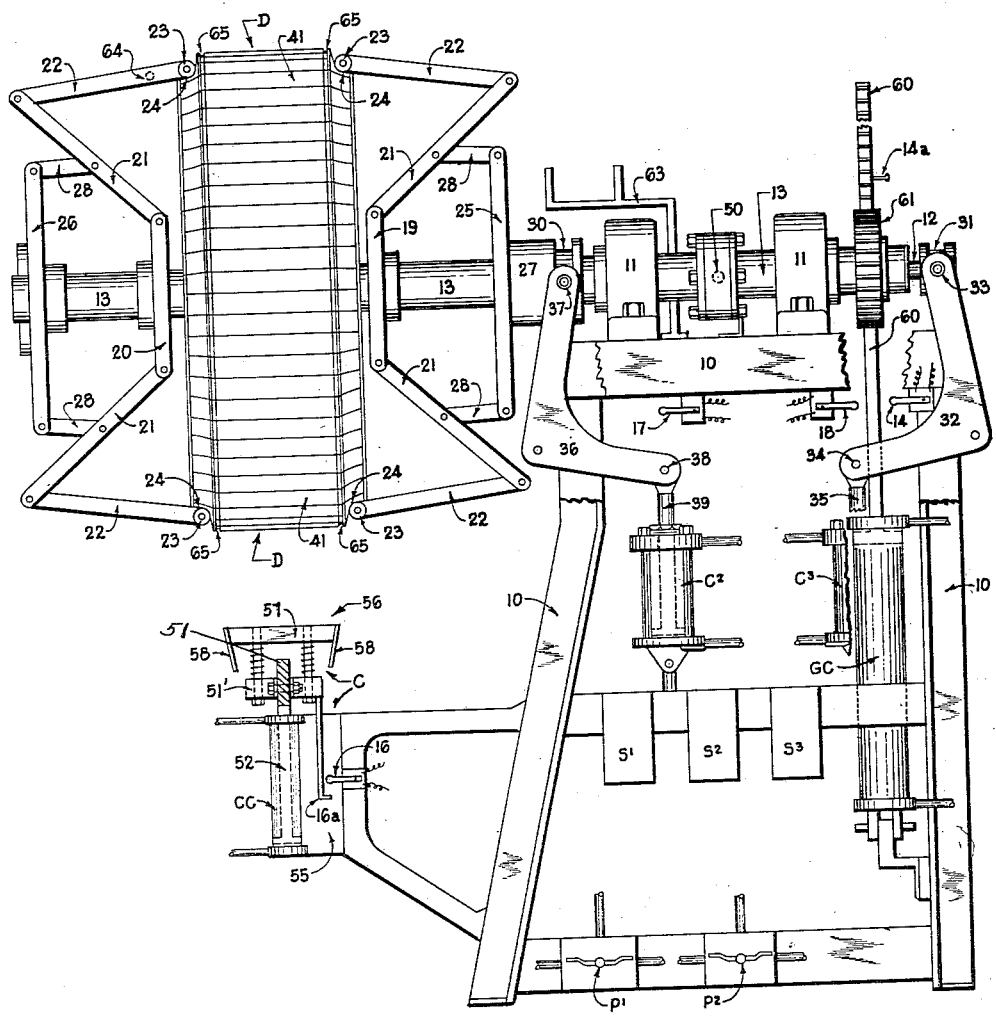
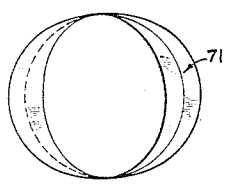
Fig. 1
Fig. 12
April 5, 1960 — R. D. PARR ET AL — 2,931,420
MACHINE FOR BUILDING TIRES
Filed Feb. 4, 1955 — 3 Sheets-Sheet 1
RUSSELL DALE PARR
JAMES L. OTSTOT
Inventors RUSSELL DALE PARR  
JAMES L. OTSTOT  
Inventors By Charles W. Hull  
Attorney

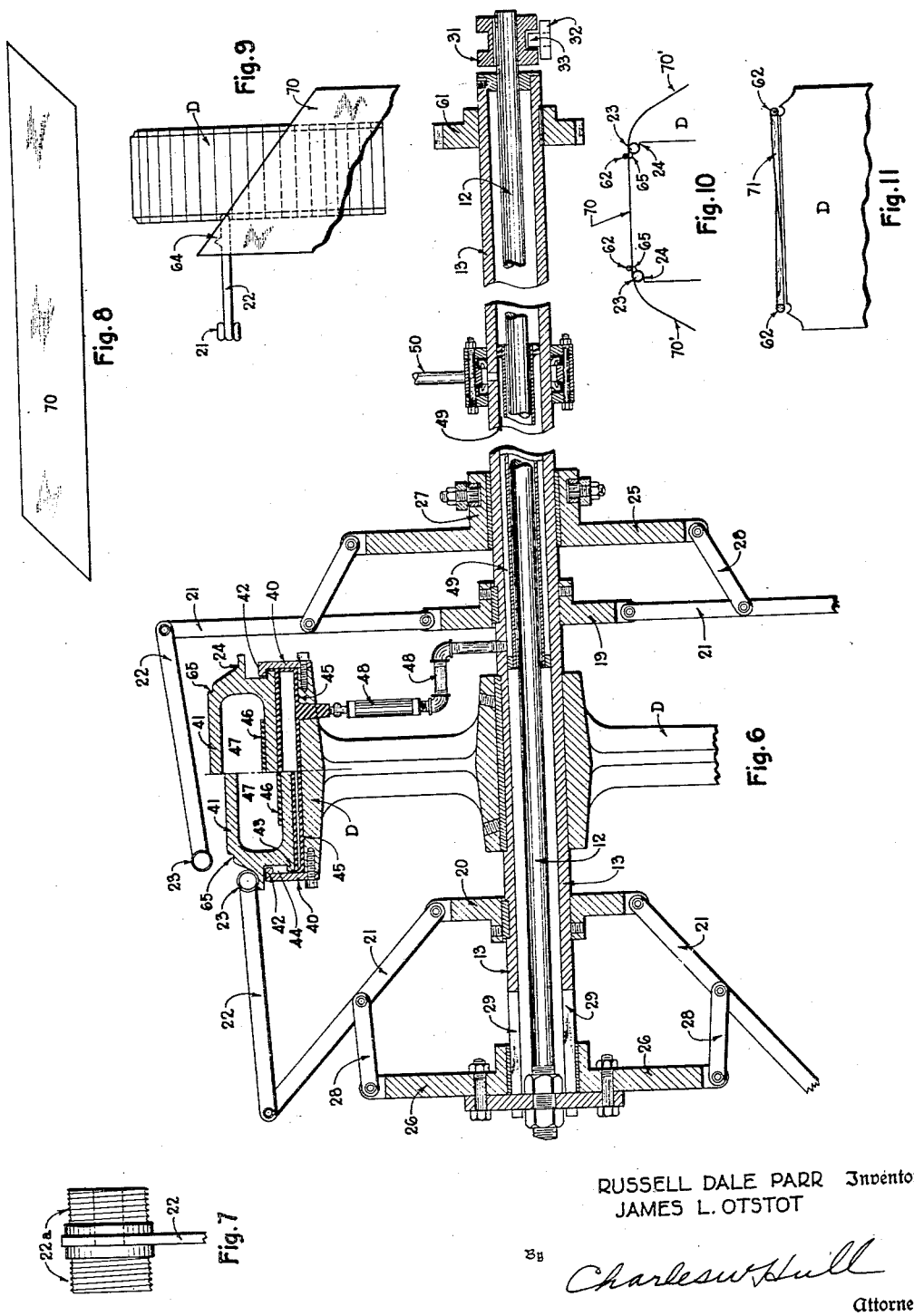

2,931,420

MACHINE FOR BUILDING TIRES

Russell Dale Parr and James L. Otstot, Carlisle, Pa., assignors to Carlisle Corporation, a corporation of Delaware Application February 4, 1955, Serial No. 486,122

9 Claims. (Cl. 154—9)

The present improvements relate in general to tire building machines, and more particularly to that type of machine adapted for building up the tire carcass, prior to molding.

Under present methods, such carcasses or blanks are fabricated almost entirely by hand. For example, an operator stands before a broad wheel having a broad and flat annular tread. He wraps a section of cord-ply around the wheel by manually turning the wheel. A pair of beads are then manually put onto the cord-ply, and the cord-ply, which overhangs the wheel on both sides of the tread is manually folded over the beads, in small sections until the entire perimeter of both beads are wrapped and the cord-ply is overlapped and built up to a "three-ply carcass."

With the present improvements, it will appear that much of the manual work is eliminated and the output of an operator not only is increased, but the resulting product is more efficient.

Accordingly, a primary object of the present improvements is to provide a novel machine having automatic features, for fabricating a tire carcass. A further object is the provision of mechanism for performing certain steps in the fabrication process, which have formerly been done by hand.

Another object is to provide a machine for fabricating a tire carcass, wherein much of the manual labor is performed by electrical and air pressure expedients.

A further object of the improvements is to provide mechanism for establishing the correct position for the beads in the fabricating process. Another object is to provide a novel folding mechanism for wrapping the cord-ply about the beads and upon itself.

A still further object is to provide a novel spring roller for folding the cord-ply.

A further object of the improvements is the provision of a device in the form of a cradle, which may be advanced and retracted relative to the drum, for the purpose of positioning beads about the drum. The provision of an expansible and collapsible drum in combination with a cradle and reciprocating rollers for folding a fabric, constitutes a further object.

These and other objects will appear to those skilled in the art, upon reference to the accompanying specification and drawings in which:

Figure 1 is a side view of the entire assembly, illustrating the preferred form of the present improvements, certain parts in section and others diagrammatically illustrated.

Figure 6 is a fragmentary transverse section of the rotary shaft, drum and related parts, looking down on the assembly in Figure 1, illustrating the spiders, toggles and rollers in advanced position and in retracted position, with certain parts omitted.

Figure 7 is a fragmentary view of a portion of the coil-spring roller mounting.

Figures 8 to 12 are more or less diagrammatic views, in miniature, wherein Figure 8 is a top-plan view of a length of cord-ply.

Figure 9 is a top-plan fragmentary view showing the manner in which the cord-ply is initially fed to the drum.

Figure 10 is a fragmentary view of the cord-ply as it appears after being wrapped in a circumferential direction about the drum.

Figure 11 is a fragmentary view showing the cord-ply folded and lapped upon itself around the beads.

Figure 12 is a perspective of the tire carcass after removal from the drum, the rubber tread having been removed.

Figure 2:
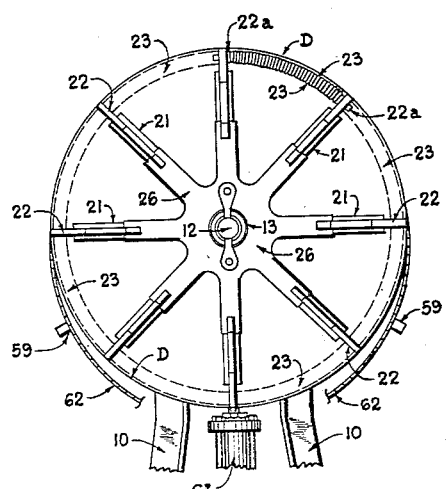
Figure 2 is a fragmentary end-view of the device illustrated in Figure 1, certain parts omitted.

Referring more particularly to the drawings, Figure 1 is a side view of the assembly, illustrating the parts in the position in which they are found at the beginning of the cycle of operations. Certain of the parts are illustrated exactly as used in the preferred form, and others are diagrammatically represented for convenience in description.

Generally speaking, the frame 10 supports bearings 11, which in turn support solid shaft 12 and hollow shaft 13. The frame 10 also serves to support cradle cylinder CC, as well as pivotally mounted cylinders GC, C2 and C3. A series of solenoids S1, S2 and S3 are also suitably mounted on frame 10, and foot actuated valves P1 and P2 may also be supported by the frame. These valves, however, may be disposed at any location convenient to the operator. The frame 10 also supports the electrical switch 14, as well as limit switches 17 and 18. Other limit switches 15 and 16 are indirectly supported on frame 10 but directly mounted on a cradle device C illustrated in more detail in Figure 4.

Suspended near the outer portion of shaft 13 is a segmental drum D, which is fixed to the shaft for rotation therewith. As will appear later on in the description, this drum comprises a plurality of segments 41 (50 in number) and may be radially expanded and contracted.

Upon reference to Figures 1 and 6, it will be seen that the drum is flanked by hubs 19 and 20, both of which are fixed to shaft 13. A series of toggle-link devices are pivoted to the hubs 19 and 20. There are eight such toggle-link devices mounted in spaced relation about the hub 19, and a similar number mounted in spaced relation about the hub 20. They each consist of a pair of outwardly flared arms 21 and inwardly flared arms 22.

As will be seen upon reference to Figure 2, the arms 22 are pivoted at one end to arms 21 and their free ends serve to hold the end of a coil spring roller 23. In this Figure 2, there are eight such coil spring rollers, each of which occupy a segment between the free ends of arms 22, and the entire eight coil springs form a complete annular coil spring roller which serves as a fabric folding device, as will later appear. For convenience in illustration, only one segment of the annular coil spring is shown in full. As seen in Figure 7, the ends of arms 22 have an aperture, in which studs 22a are journaled. The ends of the coil spring rollers 23 fit over and are anchored upon these studs. Therefore, as later described, these coil springs and studs 22a revolve about their axes, due to traction with the fabric on the drum.

The parts just described are duplicated on each side of the drum D, and it is therefore to be understood that the toggle-link mechanism and annular coil spring roller shown in Figure 2 (which is therefore on the lefthand side of the drum D in Figure 1), is duplicated on the righthand side of drum D in Figure 1.

Upon reference to Figures 1 and 6, it will be seen that the ends of arms 22, as well as the coil spring rollers 23, are located, in a rest position, in an annular trough 24. An annular trough 24 is provided on each side of the drum, so that the annular roller on each side rests therein. In the position of rest in Figure 1, the drum D is collapsed and has a diameter less than the diameter of the tire beads and of the ultimate tire carcass to be formed.

In the operation of the device, as will later appear, these annular rollers 23 are adapted to be alternately reciprocated across the outer surface of drum D, and in order to achieve this movement, a spider 25 is provided for the right-hand toggle-link mechanism in Figure 1, and another spider 26 for the left-hand toggle-link mechanism shown in that figure. Spider 25 is fixed to a freely slidable sleeve 27 surrounding shaft 13. Each of the eight arms of spider 25 are pivotally connected by links 28 to arms 21. It is apparent, therefore, upon reference to Figure 1, that when the sleeve 27 and spider 25 are moved to the left relative to shaft 13 and hub 19, that the arms 21, 22 and annular roller spring 23 will be moved up out of trough 24 and over the face of the drum to the position shown in Figure 6. By the same token, the act of retracting sleeve 27 from the position shown in Figure 6 to that in Figure 1, will retract the annular roller 23.

Exactly the same advance and retraction of the left-hand roller 23 in Figures 1 and 6 is achieved by a transverse movement of spider 26, the arms of which are connected to the toggle-link devices by pivoted links 28. The sliding movement of spider 26 relative to hub 20 is achieved by a shifting movement imparted to shaft 12, which is disposed within shaft 13. This relation of parts may be more clearly seen in Figure 6. In that figure, the spider 26 is fixed to shaft 12, and is adapted to slide relative to shaft 13 by virtue of the shaft 13 having a split end forming slots 29. By this expedient, the spider 26 may be moved transversely of shaft 13 but rotates with that shaft.

It will be seen upon reference to Figures 1 and 6, that the sleeve 27 is provided with a collar 30 and the shaft 12 is provided at its outer right-hand end with a collar 31. These collars serve as connecting links with the air pressure cylinders, whereby the reciprocation of the annular rollers is accomplished.

Referring to Figure 1, the pivoted bell crank lever 32 has a stud 33 at its free end, which rides in collar 31. The other end of the bell crank 32 is pivoted at 34 to shaft 35, terminating in a piston head within air pressure cylinder C3.

A similar bell crank lever 36 has a stud 37 disposed in collar 30, with its opposite end pivoted at 38 to shaft 39, which terminates in a piston head mounted within air pressure cylinder C2.

It will thus be apparent that an upward movement of shaft 35 will move shaft 12 to the right in Figure 1, thereby moving the lefthand annular roller 23 over the face of the drum. Obviously upon lowering the shaft 35 the parts are returned to the position illustrated in Figure 1. Likewise, when shaft 39 is raised, the sleeve 27 is shifted to the left, from the position in Figure 1 to the position in Figure 6, and when shaft 39 is lowered, the parts return to the position shown in Figure 1. This movement causes the advance and retraction of the right-hand annular roller 23 over the face of the drum.

Mechanism for expanding and contracting the drum is shown in detail in Figure 6. The drum D is provided on each side with annular rings 40 having annular grooves, the walls of which serve to retain the plurality of segments 41 in proper relationship. The rings 40 and segments 41 are provided with lips 42 and 43 and when the drum is collapsed there is a space 44 between these lips. This space, however, enables expansion of the drum, and under such circumstances the lips 42 and 43 engage and arrest further expansion of the drum segments. This relation of parts is shown in Figure 6 where half the drum is illustrated in section in collapsed position, and the other half in expanded position.

Expansion of the drum segments is achieved by means of an annular rubber air-bag 45 disposed within the drum and beneath the drum segments. Contraction of the drum segments is accomplished by means of a rubber belt 46 mounted within the hollow annular cavity 47 defined by the aforesaid fifty segments of the drum.

Means for admitting air pressure to the bag 45 is provided, by air conduit 48, which communicates with chamber 49 and an air pressure source supplied through pipe 50. As clearly seen on Figure 6, the chamber 49 is sealed to afford ready access of air from source 50 to the air bag 45. When air is admitted to the bag 45, it expands and also moves the drum segments from contracted position to expanded position, and during this movement the rubber belt 46 is placed under tension. When the air is voided from bag 45, as later described, the rubber belt 46 restores the expanded drum segments to collapsed position.

Means is provided for assisting the operator in correctly positioning the pair of annular beads to form a part of the tire carcass. In the preferred embodiment this comprises a cradle device C, illustrated in Figures 4 and 5, and also in Figure 1, at the lower left of frame 10. This device consists of a cresent shaped plate 51 supported by shaft 52, terminating in a piston head within air cylinder CC. Upon reference to Figure 4, it will be seen that guide rods 53 attached to the plate 51 depend from that plate and are freely slideable within fixed sleeves 54 on the cylinder supporting plate 55. In the position shown in Figure 4, the air cylinder CC has raised shaft 52 and plate 51 to the uppermost position into engagement with drum D. In Figure 1, however, the parts are illustrated in lowermost position, and somewhat below the drum surface.

At spaced points along the crescent shaped plate 51, moveable bead spacing devices 56 are provided. The structure of these devices 56 is set forth in detail in Figure 5. It consists of a cross arm or shoe 57 having the same transverse dimension as the drum area between the bead grooves 65. These shoes terminate in inwardly depending skirts 58 which provide stops against the premature or accidental movement of coil spring rollers 23. The shoe 57 is supported by spring pressed bolts which slidably extend through collars 51' on each side of the crescent shaped plate 51. It is apparent that the coil springs surrounding the bolts and retained between collars 51' and shoes 57 hold the shoe 57 in the illustrated position in Figure 5, but when the shoe 57 encounters the expanding drum as hereinafter described, the shoe will yield and move relative to and toward plate 51, and the coil springs are placed under compression. It is therefore apparent that with the cradle in the position shown in Figure 1, air pressure may be admitted to elevate the cradle against the deflated drum as far as the position shown in Figure 4. Thereupon, when the drum is expanded it will move the shoes 57 relative to and toward crescent plate 51, and this plate 51 remains stationary for the time being. The purpose of this movement will be described later.

Figure 3:
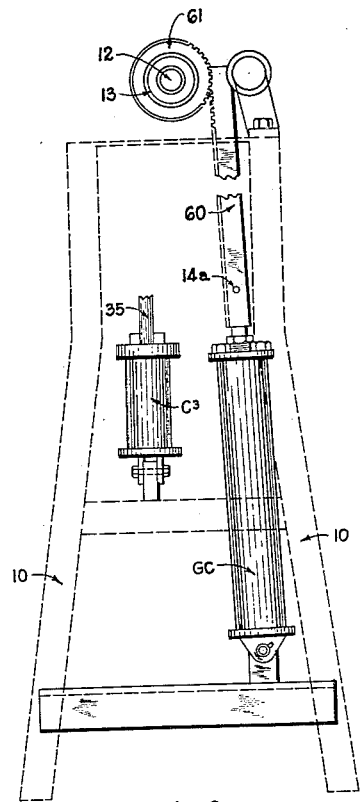
Figure 3 is also a fragmentary end-view of the device of Figure 1, looking at the end opposite from that illustrated in Figure 2.

Mechanism for imparting a complete revolution to the drum D is shown in Figure 3, as well as Figure 1. For this purpose the cylinder GC is pivotally mounted to the frame 10 and its piston and piston rod terminate in a rack 60, which engages gear 61 keyed to hollow shaft 13. The rack is in elevated position at the start of the operation cycle. Downward movement of the rack from the position in Figure 1 to that in Figure 3 causes a complete revolution of the drum in a counterclockwise direction (looking at Figure 2). Correspondingly, movement of the rack 60 from the position in Figure 3 to that in Figure 1 produces one complete revolution of the drum in a clockwise direction. As later described, air under pressure is admitted to cylinder GC for causing this movement. Downward movement of rack 60, also produces engagement of switch 14 and closes the circuit to solenoid, S1.

A source of air pressure (not shown) is provided, supplied to and employed in the cylinders CC, GC, C2 and C3, as well as in air bag 45. With respect to the cylinders, adjustable needle valves (not shown) are provided to control the pressure. The air pressure admitted to air bag 45 for expanding the drum is reduced, however, to about 5 pounds per square inch by means of an air tank (not shown) in the line. This expedient is necessary to protect the rubber bag 45 from undue pressure.

Operation: Figures 8 to 12 are provided to illustrate, more or less diagrammatically, various steps in the fabrication of the tire carcass from the cord-ply strip 70 in Figure 8 to the finished tire carcass 71 in Figure 12. The cycle of operation however, will be best observed upon reference to Figures 1 and 6. As a preliminary step, a supply of cord-ply strips such as 70 (Figure 8) are made available from a table deposited adjacent to the drum. The length of cord-ply 70 is substantially the circumference of the drum and the width of cord-ply 70 is more than twice that of the drum. Furthermore, a supply of annular hoop-like beads 62 is also provided on each side of the drum D. The beads having metallic cores, are of the type referred to in Patent No. 2,662,467 and a rack 63 may be provided for supporting the supply on the right-hand side of drum D while any suitable support (not shown) may carry a similar supply of beads at the left of the drum.

The operator faces the drum in Figures 1 and 9, in the same position as the observer, and grasps the end of a strip of cord-ply 70 from a supply table. The oblique tip of the cord-ply 70 is manually attached to the mechanism by pressing it over a spike 64 mounted on one of the arms 22 (Figure 9). The four-way valve is now actuated by depressing valve P2, which admits air under pressure above the piston in cylinder GC, thereby depressing rack 60, which rotates drum D in a direction away from the operator (counter clockwise in Figure 2) and the cord-ply is thereby wrapped around the drum. The drum comes to rest after one complete revolution. The trailing free end of the cord-ply, which is also cut obliquely, is lapped over the first portion attached to the spike, and as the cord ply is tacky, the operator employs hand pressure to effect a diagonal splice. With the same movement the operator manually disengages the cord-ply from the spike 64.

In this condition it will be seen, upon reference to Figure 10, that the cord-ply not only covers the width of the drum but has over-hanging skirt portions 70' on either side of the drum. These skirt portions 70' also lie over the annular rollers 23. Proper location of the peripheral beads 62 is now effected by manipulation of the bead-positioning device previously described and generally characterized as the cradle C.

Actuation of this cradle device is started by the descending movement of rack 60. As it reaches the lower limit of its travel (which completes the first complete revolution of the drum D) a lug 14a, on the rack 60, engages and passes over pivot switch 14. The switch closes the circuit which energizes solenoid S1, and this in turn actuates an air valve (not shown) to admit air to the cradle cylinder CC. The entire cradle mechanism is thereby slowly elevated from the position shown in Figure 1 to the position shown in Figure 4. This moves the shoes 57 (which are six in number) against the cord-ply 70, which has previously been wrapped around the drum. The operator thereupon grasps a bead 62 in each hand from the supply on both sides of the drum, and places them over the cord-ply 70 in the positions shown in Figures 1 and 10. It will be noted that small grooves 65 are provided in the surface of the drum, to assist the operator in properly locating the beads in spaced relation on the top of the drum. These beads are placed over the cord-ply and in alignment with and alongside of the grooves 65.

To assist the operator in locating the beads at the diametrically opposite and lower limit of the drum, magnets 59 are provided on crescent plate 51 adjacent the inclined skirt members 58. When the annular beads are placed on the top of the drum, the diametrically opposite portion of the beads are attracted by the magnets 59, and held in position in alignment with and alongside of grooves 65. Beads of this type with metallic cores, are common in the art. The operator is thereupon assured that the beads 62 on either side, are properly in alignment with grooves 65, preparatory to the folding operation of the cord-ply.

The operator now depresses the 3-way pedal valve P1, which admits air through pipe 50, chamber 49 and inflates air bag 45, thereby expanding the drum from the collapsed position in Figure 6 to the inflated position shown in Figure 6. This expanding motion presses the cord-ply 70 to a taut, tense condition, while the drum is expanded to the exact diameter of the beads 62. The diameter of the beads therefore assists in determining the degree of drum expansion. It is apparent that the original diameter of the drum in collapsed position is slightly less than the diameter of the beads 62.

With this movement the expanding drum carries with it the shoes 57, and moves them toward the crescent shaped plate 51. This causes one of the shoe bolts (see Figure 4) to engage limit switch 15. This movement actuates solenoid S1, and the air pressure is reversed in cylinder CC, whereupon the cradle C is retracted, to the position shown in Figure 1.

As the entire cradle C is depressed, a lug 16a engages limit switch 16, which energizes solenoid S2 and actuates an air valve (not shown) to elevate the piston in cylinder C2. This causes the bell crank lever 36 to advance and move the right-hand annular roller 23 over the surface of the drum from the position in Figure 1 to the position in Figure 6. As will be apparent upon reference to Figure 10, this roller will carry with it the right-hand skirt 70' of the cord-ply and fold it over the right-hand bead 62 along the entire 360° of the drum, and the coil spring rollers will constantly exert pressure on the lapped skirt portions 70' and thereby cause them to effect an intimate union with that portion of the cord-ply underneath. These annular rollers 23 apply a contracting pressure or squeeze onto the cord-ply, as they roll or revolve during travel over the drum surface and back again.

When this advance of the right-hand annular roller reaches the limit of its travel, the ascending piston rod 39 engages limit switch 17, which de-energizes solenoid S2, thereby reversing the air pressure in cylinder C2, which serves to retract the rollers 23 to their original position. At the same time limit switch 17 energizes solenoid S3, which actuates an air valve (not shown) admitting air beneath the piston in cylinder C3, which causes clockwise movement of bell crank lever 32. This movement pulls shaft 12 to the right, and the left-hand annular roller 23 (in Figure 1) is advanced over the drum, carrying with it the left-hand skirt 70' (see Figure 10) of the cord-ply. This movement thereby laps this portion of the cord-ply over the top of that portion of the cord-ply previously folded, and also exerts a squeeze or pressure on the ply and folds the skirt 70' along 360° of the drum. The cord-ply and beads are now in the form shown in Figure 11, and the left-hand annular roller 23 has exerted pressure on the three plies of cord, and effected a more intimate union, between the cord-ply and the beads, as well as between the plies themselves.

When this left-hand roller 23 reaches the limit of its advance over the drum, the piston rod 35, upon reaching the upper limit of its travel, engages limit switch 18, which de-energizes solenoid S3, reversing the air in the cylinder C3, thereby retracting the left-hand annular roller 23 to its original position. At this stage of the operation, a three ply carcass such as illustrated at 71 in Figure 12, has been fabricated on the drum D.

The view in Figure 11 shows the plies in spaced relation, for clarity in illustration. However, it is to be understood, that in the finished product, the three plies are intimately bonded upon one another.

Although the present improvements have been primarily designed to perform the functions already described, a further operation consists at this stage in manually applying a length of rubber tread to this carcass, while it is still on the drum. This is done by having the operator superimpose the end of a strip of rubber tread onto the carcass 71 while it is still on the expanded drum. The operator thereupon depresses foot valve P2, which reverses the air pressure in cylinder GC, and rack 60 ascends while the drum is rotated 360° in a clockwise (Figure 2) direction, and the rubber tread is manually applied to the carcass until the drum comes to rest. The rubber tread is thereupon manually sheared and stitched to provide a straight or diagonal seam as desired.

If desired, the right and left-hand rollers 23 may now be alternately advanced and retracted over the rubber tread to exert further pressure, and to provide a more intimate union. This step may be employed or omitted as desired. The carcass is now ready for the next operation, in the molding machine.

The finished carcass 71 or the carcass with the rubber tread thereon, is still reposing on the expanded drum. Accordingly, the operator actuates foot valve P1, which voids the air from air bag 45. Thereupon the rubber belt 46 exerts a contracting action or pressure on the segments of the drum to retract the drum to its original deflated and collapsed condition. The finished carcass 71 is now manually taken off the drum, and appears in the outline form shown in Figure 12, with an annular bead on each periphery, and the cord-ply folded upon itself to form an intimate union. The rubber tread has not been shown in Figure 12.

The primary objective of converting a manual operation into an automatic operation, is achieved with the device as illustrated. By having the drum rotate, while the ply is applied, enables the operator to use both hands for carefully centering the cord-ply over the drum.

The employment of the annular spring rollers which travel over the surface of the ply, exerting pressure and which revolve about their own axis, assures a more even union between the plies. Heretofore, only segments of the skirts of the ply could be manually folded at a time, resulting in uneven pressure and uneven union.

Furthermore, in prior methods the pull exerted by the hands of the operator on the skirts of the cord-ply, tended to stretch the fabric unevenly. Moreover, the folds or lapping of the ply in prior methods, produced first a deep or rounded fold, after which the operator applied hand pressure. With the present improvements, a shallow or narrow fold with concurrent pressure, is achieved by the squeeze of the annular rollers. These annular rollers 23 are preferably designed in the form of coil springs. However, equivalents, such as rubber tubing or hose, may be substituted without departing from the invention.

The improvements further insure that the three-ply lapped seam of the carcass 71 is in the center, which is the area of the carcass which ultimately carries the rubber tread, and the greatest traction load when in use.

Figure 4:
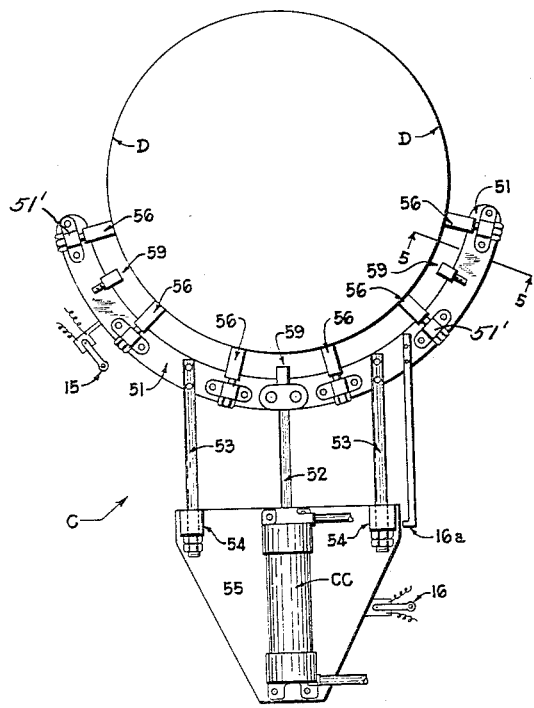
Figure 4 is an end-view of a portion of the drum in outline, illustrating in full lines, the cradle in raised position.
Figure 5:
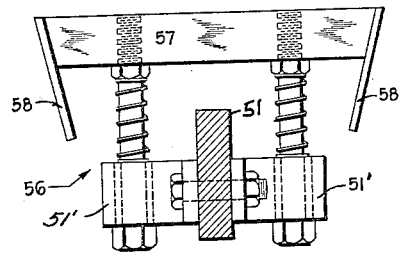
Figure 5 is an enlarged section on line 5—5 of Figure 4.

It is of course understood that the series of magnets 59 illustrated in Figure 4 are duplicated on both sides of the cradle. Moreover, their outer surfaces are in the same plane as the depending guide members 58 of the shoes 57. These magnets may be located directly on plate 51, or on the guide members 58, or at some other location on spacing members 56.

Attention is directed to the fact that pivot switches 14, 15, 16, 17 and 18 function to close a circuit when urged in one direction only, and not in both directions. It is further understood, upon inspection of Figures 1 and 6, that the mounting which forms the communication from pipe 50 to chamber 49, is fixed to and supported by frame 10, so that shaft 13 revolves relative to it.

Although the tire carcass referred to and illustrated, represents a bicycle tire carcass, it is apparent that the improvement may be employed in the manufacture of tires of any size.

The illustrated embodiment represents the preferred form of the improvements. However, various modifications of one part or another may be made without departing from the scope and spirit of the invention.

What we claim as our invention is:

1. A tire building machine comprising a rotary shaft, a drum fixedly mounted on said shaft, a pair of hubs fixedly connected on said shaft each on an opposite side of said drum, a pair of radially extending members slidably supported relative to said shaft for movement axially thereof each on an opposite side of said drum, two series of toggle-link mechanisms with each series connecting the hubs and radially extending member on one side of said drum, a pair of annular rollers each pivotally connected to one series of toggle-link mechanisms and positioned for being laterally reciprocated over said drum for folding cord-ply thereon.

2. A tire building machine comprising a rotatable shaft, a tire building drum fixedly mounted on said shaft, two hub members each fixedly mounted on said shaft with one on each side of said drum, a pair of sleeves each positioned on an opposite side of said drum and slidably mounted on said shaft for axial movement relative thereto, a pair of spiders each connected to one of said sleeves, a plurality of toggle-link devices on each side of said drum, each of said devices comprising a toggle and a link, each said toggle being pivotally connected at one of its ends to one of said hubs on its side of said drum, said toggle further having a free end and being pivotally connected intermediate its ends to its respective link at one end of said link, and said link being pivotally connected at its other end to the one of said spiders on its side of said drum, a plurality of arms each being pivotally connected to said free end of one of said toggles with said arms terminating adjacent said drum, and a pair of annular rollers each mounted on the free ends of said arms on one side of said drum and flanking each side of said drum.

3. A tire building machine comprising a rotatable shaft, a tire building drum fixedly mounted on said shaft, two hub members each fixedly mounted on said shaft, with one on each side of said drum, a pair of sleeves each positioned on an opposite side of said drum and slidably mounted on said shaft for axial movement relative thereto, a pair of spiders each connected to one of said sleeves, a plurality of toggle-link devices on each side of said drum, each of said devices comprising a toggle and a link, each said toggle being pivotally connected at one of its ends to the one of said hubs on its side of said drum, said toggle further having a free end and being pivotally connected intermediate its ends to its respective link at one end of said link, and said link being pivotally connected at its other end to the one of said spiders on its side of said drum, a plurality of arms each being pivotally connected to said free end of one of said toggles, said arms terminating adjacent said drum, a pair of annular rollers each mounted on the free ends of said arms on one side of said drum and flanking each side of said drum, and means for alternately sliding said spiders and thereby said rollers over a peripheral portion of said drum.

4. A tire building machine comprising a rotatable shaft, an expansible drum fixedly mounted on said shaft, means for radially expanding said drum, two hub members fixedly mounted on said shaft with one on each side of said drum, a pair of sleeves each positioned on an opposite side of said drum and slidably mounted on said shaft for axial movement relative thereto, a pair of spiders each connected to one of said sleeves, a plurality of toggle-link devices on each side of said drum, each of said devices comprising a toggle and a link, each said toggle being pivotally connected at one of its ends to the one of said hubs on its side of said drum, said toggle further having a free end and being pivotally connected intermediate its ends to its respective link at one end of said link, and said link being pivotally connected at its other end to the one of said spiders on its side of said drum, a plurality of arms each being pivotally connected to said free end of one of said toggles, said arms terminating adjacent said drum, a pair of annular rollers each mounted on the free ends of said arms on one side of said drum and flanking each side of said drum, means for alternately sliding said spiders and thereby said rollers over a peripheral portion of said drum, and means for contracting said drum.

5. A tire building machine comprising a rotatable shaft, means for revolving said shaft through a fixed arc of substantially one revolution, an expansible drum fixedly mounted on said shaft, pneumatic means for expanding said drum, two hub members fixedly mounted on said shaft with one on each side of said drum, a pair of sleeves each positioned on an opposite side of said drum and being slidably keyed to said shaft for axial movement relative thereto, a pair of spiders each connected to one of said sleeves, a plurality of toggle-link devices on each side of said drum, each said devices comprising a toggle and a link, each said toggles being pivotally connected at one of its ends to the one of said hubs on its side of said drum, said toggle having a free end and being pivotally connected intermediate its ends to its respective link at one end of said link, said link being pivotally connected at its other end to the one of said spiders on its side of said drum, a plurality of arms each being pivotally connected to said free end of one of said toggles, said arms terminating adjacent said drum, a pair of annular rollers each mounted on the free ends of said arms on its side of said drum and flanking each side of said drum, pneumatic means for alternately sliding said spiders and thereby said rollers over a peripheral portion of said drum, and means for contracting said drum.

6. A tire building machine comprising a rotatable shaft, an expansible drum fixedly mounted on said shaft, a bead-positioning cradle adjacent to and spaced radially outwardly from the periphery of said drum, means for releasably attaching cord-ply to the periphery of said drum, mechanism for advancing said cradle to engagement with said drum periphery, means for revolving said drum through a fixed arc of substantially one revolution, means for radially expanding said drum, means for retracting said bead-positioning cradle, two hub members fixedly mounted on said shaft with one on each side of said drum, a pair of sleeves each positioned on an opposite side of said drum and being slidably connected to said shaft for axial movement relative thereto, a pair of spiders each connected to one of said sleeves, a plurality of toggle-link devices on each side of said drum, each said device comprising a toggle and a link, each said toggle being pivotally connected at one of its ends to one of said hubs, said toggle having a free end and being pivotally connected intermediate its ends to its respective link at one end of said link, said link being pivotally connected at its other end to one of said spiders, a plurality of arms each being pivotally connected to said free end of one of said toggles, with said arms terminating adjacent said drum, a pair of annular rollers mounted on the free ends of said arms on one side of said drum and flanking each side of said drum, pneumatic means for alternately sliding said spiders and thereby said rollers over a peripheral portion of said drum, and means for contracting said drum.

7. A tire building machine comprising a rotatable shaft, a radially expansible drum fixedly mounted on said shaft, a bead positioning cradle adjacent to and spaced radially outwardly from the periphery of said drum, means for releasably attaching cord-ply to the periphery of said drum, mechanism for advancing said cradle to engagement with said drum periphery, means for revolving said drum through a fixed arc of substantially one revolution, means for expanding said drum, means for retracting said bead-positioning cradle, two hub members fixedly mounted on said shaft with one on each side of said drum, a pair of sleeves each positioned on an opposite side of said drum and being slidably keyed to said shaft for rotation therewith an axial movement relative thereto, a pair of spiders each fixedly connected to one of said sleeves, a plurality of toggle-link devices on each side of said drum, each said device comprising a toggle and a link, each said toggle being pivotally connected at one of its ends to the one of said hubs on its side of said drum, said toggle having a free end and being pivotally connected intermediate its ends to its respective link at one end of said link, said link being pivotally connected at its other end to the one of said spiders on its side of said drum, a plurality of arms each being pivotally connected to said free end of one of said toggles with said arms terminating adjacent said drum, a pair of annular rollers each comprising coil-spring segments connected to and spanning the free ends of said arms on one side of said drum and flanking each side of said drum, pneumatic means for alternately sliding said rollers over a peripheral portion of said drum, and means for contracting said drum.

8. In a tire building machine, a cord-ply folding device comprising a rotatable shaft, a drum fixedly mounted on said shaft, a hub fixedly mounted on said shaft, a sleeve slidably mounted on said shaft, means for reciprocating said sleeve, said sleeve being slidably keyed to said shaft for rotation therewith and axial movement relative thereto, a spider fixedly connected to said sleeve, a plurality of toggle-link devices connecting said hub and said spider, each said toggle-link device comprising a toggle and a link, said toggle being pivotally connected at one of its ends to said hub, said toggle having a free end and being pivotally connected intermediate its ends to said link at one end of said link, said link being pivotally connected at its other end to said spider, a plurality of arms each being pivotally connected to said free end of one of said toggles, and a roller rotatably mounted on the free ends of said arms for being reciprocated over the periphery of said drum upon movement of said sleeve for folding cord-ply thereon.

9. In a tire building machine, a cord-ply folding device comprising a rotatable shaft, a drum fixedly mounted on said shaft, a hub fixedly mounted on said shaft, a sleeve slidably mounted on said shaft, said sleeve being slidably connected to said shaft for rotation therewith and axial movement relative thereto, a spider fixedly connected to said sleeve, a plurality of toggles, a plurality of links, each said toggle being pivotally connected at one of its ends to said hub, said toggle having a free end and being pivotally connected intermediate its ends to one of said links at one end of said link, each said links being pivotally connected at its other end to said spider, a plurality of arms each being pivotally connected to said free end of one of said toggles, an annular roller mounted on the free ends of said arms, and means for advancing and retracting said sleeve axially relative to said hub for laterally moving said roller over said drum periphery.

References Cited in the file of this patent

UNITED STATES PATENTS

| | | |
|---|---|---|
| 2,313,035 | Breth | Mar. 9, 1943 |
| 2,477,718 | Breth | Aug. 2, 1949 |
| 2,490,445 | Kuffler | Dec. 6, 1949 |
| 2,642,921 | Appleby | June 23, 1953 |
| 2,685,909 | Deist | Aug. 10, 1954 |
| 2,778,403 | Hackney et al. | Jan. 22, 1957 |
| 2,790,481 | Beckadolph et al. | Apr. 30, 1957 |